US008112209B2

(12) United States Patent  
Ogawa et al.

(10) Patent No.: US 8,112,209 B2
(45) Date of Patent: Feb. 7, 2012

(54) VEHICLE DRIVING FORCE CONTROL DEVICE

(75) Inventors: Hiroyuki Ogawa, Susono (JP); Kenji Arai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 380 days.

(21) Appl. No.: 12/525,829

(22) PCT Filed: Mar. 10, 2008

(86) PCT No.: PCT/JP2008/054318

§ 371 (c)(1),
(2), (4) Date: Aug. 5, 2009

(87) PCT Pub. No.: WO2008/114641

PCT Pub. Date: Sep. 25, 2008

(65) Prior Publication Data

US 2010/0324789 A1    Dec. 23, 2010

(30) Foreign Application Priority Data

Mar. 16, 2007    (JP) .................................. 2007-069035

(51) Int. Cl.
*G06F 19/00*    (2006.01)
(52) U.S. Cl. ........... 701/54; 477/174; 477/176; 477/186
(58) Field of Classification Search ................ 701/54, 701/85; 477/174, 176, 186, 115, 120, 108
See application file for complete search history.

(56) References Cited

U.S. PATENT DOCUMENTS 6,371,884 B1    4/2002    Channing
(Continued)

FOREIGN PATENT DOCUMENTS

JP         9 119328    5/1997
(Continued)

OTHER PUBLICATIONS

Control of a self-bearing servomotor; Grochmal, T.; Lynch, A.; Control Systems, IEEE; vol. 29 , Issue: 5; Digital Object Identifier: 10.1109/MCS.2009.933488; Publication Year: 2009 , pp. 74-92.*

(Continued)

*Primary Examiner* — Cuong H Nguyen
(74) *Attorney, Agent, or Firm* — Oblon, Spivak, McClelland, Maier & Neustadt, L.L.P.

(57) ABSTRACT

A vehicle driving force control device including an input shaft rotation number sensor which detects a transmission input shaft rotation number to be input from an engine to an automatic transmission, an accelerator opening sensor which detects accelerator opening, a TCU for calculating a required output of the automatic transmission based on the transmission input shaft rotation number and the accelerator opening, and an electronic control unit which controls the engine and the automatic transmission based on the required output. The TCU sets the required output to a constant value regardless of the transmission input shaft rotation number when the accelerator opening is not larger than a predetermined value, and sets to increase or decrease the required output according to increase and decrease of the transmission input shaft rotation number when the accelerator opening is larger than the predetermined value.

3 Claims, 3 Drawing Sheets

U.S. PATENT DOCUMENTS

| | | | |
|---|---|---|---|
| 6,434,466 B1 * | 8/2002 | Robichaux et al. | 701/54 |
| 7,189,188 B2 * | 3/2007 | Nobumoto et al. | 477/176 |
| 7,357,754 B2 * | 4/2008 | Roses | 477/143 |
| 7,582,042 B2 * | 9/2009 | Sato et al. | 477/158 |
| 7,643,924 B2 * | 1/2010 | Kawamura et al. | 701/62 |
| 2004/0229728 A1 * | 11/2004 | Oshima et al. | 477/176 |
| 2004/0259684 A1 | 12/2004 | Kresse et al. | |

FOREIGN PATENT DOCUMENTS

| | | | |
|---|---|---|---|
| JP | 2002 303169 | | 10/2002 |
| JP | 3539075 | | 6/2004 |
| JP | 2005 110469 | | 4/2005 |
| JP | 2005-173972 | * | 6/2005 |
| JP | 2005-368216 | * | 12/2005 |
| JP | 2007 64180 | | 3/2007 |

OTHER PUBLICATIONS

Torsional Vibration Effects on Induction Machine Current and Torque Signatures in Gearbox-Based Electromechanical System Kia, S.H.; Henao, H.; Capolino, G.-A.; Industrial Electronics, IEEE Transactions on; vol. 56 , Issue: 11; Digital Object Identifier: 10.1109/TIE.2009.2026772; Publication Year: 2009 , pp. 4689-4699.*

Control Unit for a Continuous Variable Transmission for use in an Electric Car; Galea, F.; Gatt, E.; Casha, O.; Grech, I.; Electronics, Circuits, and Systems (ICECS), 2010 17th IEEE International Conference on; Digital Object Identifier: 10.1109/ICECS.2010.5724500; Publication Year: 2010 , pp. 247-250.*

Digital Measuring System for Monitoring Motor Shaft Parameters on Ships; Dzapo, H.; Stare, Z.; Bobanac, N.; Instrumentation and Measurement, IEEE Transactions on; vol. 58 , Issue: 10 ; Digital Object Identifier: 10.1109/TIM.2009.2019316 Publication Year: 2009 , pp. 3702-3712.*

Gear shift control of Dual Clutch Transmissions with a torque rate limitation trajectory; Kim, Jinsung; Cho, Kwanghyun; Choi, Seibum B.; American Control Conference (ACC), 2011; Publication Year: 2011 , pp. 3338-3343.*

Research on control strategy and simulation analysis for Dual Motor Powertrain configuration with Gasoline Direct Injection engine; Li Jun; Zhao Ziliang; Liu Minghui; Jin Qiqian; Vehicle Power and Propulsion Conference, 2008. VPPC '08. IEEE Digital Object Identifier: 10.1109/VPPC.2008.4677806; Publication Year: 2008 , pp. 1-4.*

Dynamics of spiral bevel gear rattling system; Jianjun Yang; Kai Xu; Xiaozhong Deng; Bingyang Wei; Mechanic Automation and Control Engineering (MACE), 2010 International Conference on; Digital Object Identifier: 10.1109/MACE.2010.5536488 Publication Year: 2010 , pp. 2555-2558.*

The influence of parallel hybrid vehicle on synchronizer performance; Xin, Xiangyan; Zhong, Zaimin; Mechatronic Science, Electric Engineering and Computer (MEC), 2011 International Conference on; Digital Object Identifier: 10.1109/MEC.2011.6025566; Publication Year: 2011 , pp. 721-724.*

Extended European Search Report issued on Aug. 31, 2011 in the corresponding European Application No. 08721734.5.

* cited by examiner

VEHICLE DRIVING FORCE CONTROL DEVICE

TECHNICAL FIELD

The present invention relates to a vehicle driving force control device for controlling an output of a vehicle by controlling an internal combustion engine and a transmission in response to an output request by a driver in the vehicle equipped with the internal combustion engine, a torque converter, and the transmission.

BACKGROUND ART

In the vehicle driving force control, in general, target (i.e., required) torque requested by the driver is obtained based on accelerator opening, which varies as the driver depresses an accelerator pedal. Based on the target torque, throttle opening, a fuel injection amount, and ignition timing of the engine are controlled. On the other hand, in the vehicle equipped with an automatic transmission, torque down control is performed to ease a shift shock caused by shift operation by temporarily lowering engine torque during the shift operation. In the torque down control, output torque of the engine is lowered by calculating a torque down amount and torque down timing and slowing the ignition timing of the engine in the proportion corresponding to a torque down required amount, for example.

The vehicle driving force control device equipped with such engine and automatic transmission is, for example, disclosed in Patent Document 1.

In an engine output control device disclosed in Patent Document 1, an output signal of an accelerator sensor is input to an engine control unit as an accelerator opening signal through an adjusting unit, the engine control unit controls an output state of the engine by actuating an electronic control throttle valve based on the accelerator opening signal, and at that time, correspondence relationship between the output signal of the accelerator sensor and the accelerator opening signal is temporarily changed by the adjusting unit in the course of the gear shift, and the throttle opening of the electronic control throttle valve is reduced by a predetermined width, thereby the engine torque down is carried out and the shift shock in the course of the gear shift of the automatic transmission is reduced.

Patent Document 1: Japanese Patent Application Laid-Open No. H09-119328

DISCLOSURE OF INVENTION

Problem to be Solved by the Invention

In the above-described conventional vehicle engine output control device, the electronic control throttle valve is used, and the engine control unit carries out the engine torque down by reducing the throttle opening of the electronic control throttle valve by a predetermined width with respect to the output signal of the accelerator sensor in the course of the gear shift of the automatic transmission, thereby reducing the shift shock of the automatic transmission. In this case, the engine control unit sets the torque down amount with which a shift quality is the best, calculates a variation amount of the throttle opening matching the torque down amount, and reduces the throttle opening of the electronic control throttle valve.

When the driver depresses the accelerator pedal to accelerate the vehicle, the driver wants different types of acceleration feel according to driving condition. For example, in some cases the driver prefers smooth acceleration feel with a little change in driving force, on the other hand, in other cases the driver prefers strong acceleration feel. However, in the above-described conventional engine output control device, the shift shock of the automatic transmission is reduced by reducing the throttle opening matching the torque down amount. Variation in a gear ratio before and after the gear shift is not gradually smooth according to shift of a gear position in a stepped automatic transmission, so that compatibility of reduction of the shift shock and the acceleration feel required by the driver is difficult especially in the operating condition of the vehicle requiring the strong acceleration feel.

The present invention is to solve such a problem, and an object thereof is to provide a vehicle driving force control device capable of realizing the acceleration feel required by the driver and of reducing the shift shock.

Means for Solving Problem

To solve the problems as described above and to achieve an object, a vehicle driving force control device according to the present invention includes: transmission input shaft rotation number detecting means for detecting a transmission input shaft rotation number input from an internal combustion engine to a transmission; accelerator opening detecting means for detecting accelerator opening; transmission required output calculating means for calculating a required output of the transmission based on the transmission input shaft rotation number detected by the transmission input shaft rotation number detecting means and the accelerator opening detected by the accelerator opening detecting means; and output controlling means for controlling the internal combustion engine and the transmission based on the required output calculated by the transmission required output calculating means. The transmission required output calculating means sets the required output to a constant value regardless of the transmission input shaft rotation number detected by the transmission input shaft rotation number detecting means when the accelerator opening detected by the accelerator opening detecting means is not larger than a predetermined value set in advance, and on the other hand, increases or decreases the required output according to increase or decrease in the transmission input shaft rotation number detected by the transmission input shaft rotation number detecting means when the accelerator opening detected by the accelerator opening detecting means is larger than the predetermined value.

According to the vehicle driving force control device of the present invention, when the accelerator opening detected by the accelerator opening detecting means is not larger than the predetermined value set in advance, the transmission required output calculating means may increase or decrease the required output according to increase or decrease in the transmission input shaft rotation number when the transmission input shaft rotation number detected by the transmission input shaft rotation number detecting means is in a predetermined low rotation area set in advance, and may set the required output to the constant value regardless of the transmission input shaft rotation number when the transmission input shaft rotation number is in an area higher than the low rotation area.

According to the vehicle driving force control device of the present invention, a torque converter may be arranged between the internal combustion engine and the transmission, and the transmission input shaft rotation number detecting means may detect the transmission input shaft rotation number input from the internal combustion engine to the transmission through the torque converter.

Effect of the Invention

The vehicle driving force control device of the present invention is provided with the transmission required output calculating means for calculating the required output of the transmission based on the transmission input shaft rotation number and the accelerator opening, and the output controlling means for controlling the internal combustion engine and the transmission based on the required output, in which the transmission required output calculating means sets the required output to the constant valve regardless of the transmission input shaft rotation number when the accelerator opening is not larger than the predetermined valve set in advance, and on the other hand, increases or decreases the required output according to increase and decrease in the transmission input shaft rotation number when the accelerator opening is larger than the predetermined value, so that it is possible to realize the smooth acceleration with small difference in driving force before and after the gear shift transmission by setting the required output to the constant value when the accelerator opening is not larger than the predetermined value, and it is possible to realize the strong acceleration with small dropping of the driving force after the gear shift by increasing or decreasing the required output according to increase and decrease in the transmission input shaft rotation number when the accelerator opening is larger than the predetermined value, thereby enabling to realize the acceleration feel required by the driver and to reduce the shift shock.

EXPLANATION OF LETTERS OR NUMERALS

Figure 1:
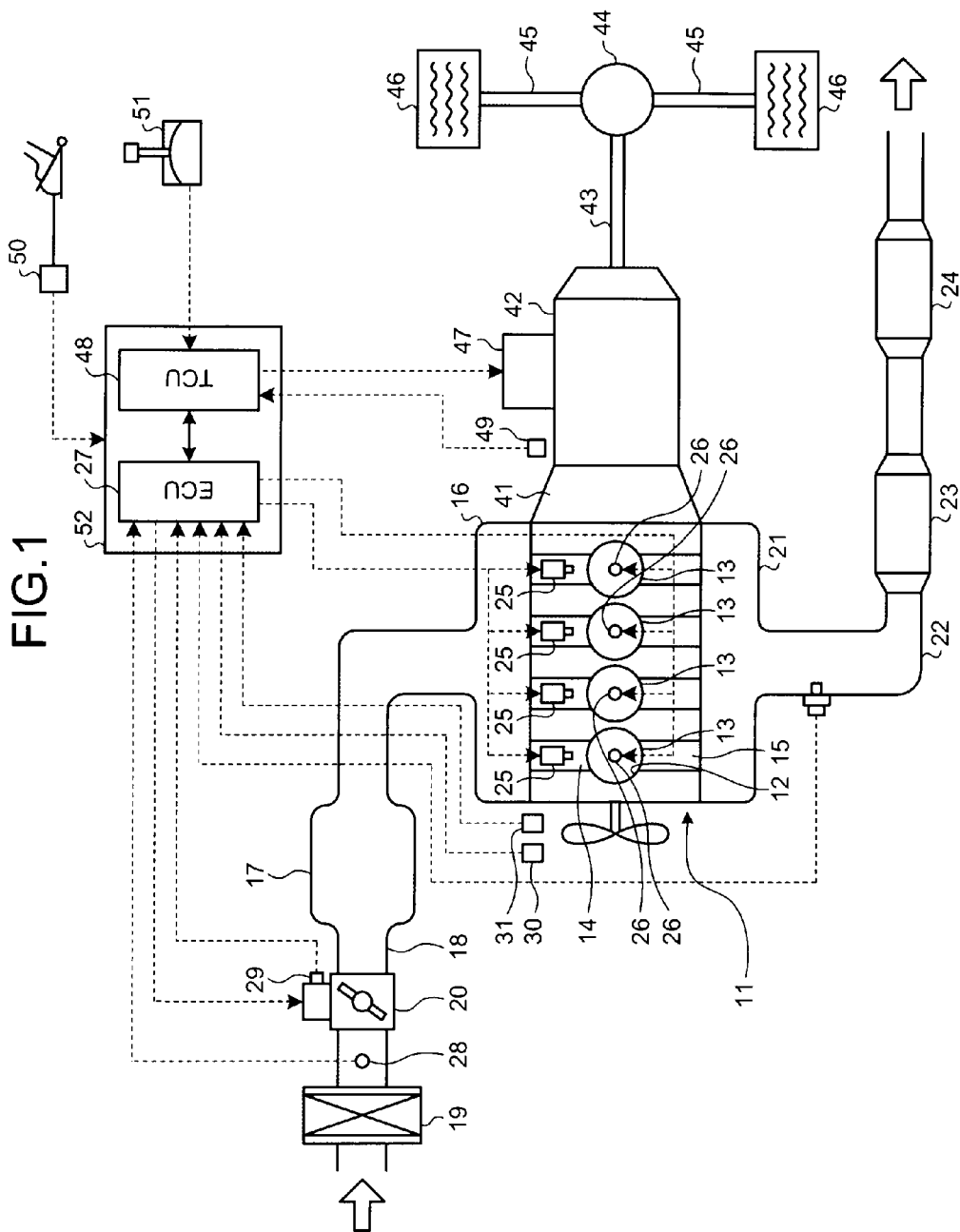
FIG. 1 is a schematic configuration diagram of a vehicle driving force control device according to one embodiment of the present invention.

11 engine (internal combustion engine)
20 electronic control throttle device
25 injector
26 ignition plug
27 engine control unit (ECU)
41 torque converter
42 automatic transmission
47 hydraulic control device
48 transmission control unit, TCU (transmission required output calculating means)
49 input shaft rotation number sensor (transmission input shaft rotation number detecting means)
50 accelerator opening sensor (accelerator opening detecting means)
52 electronic control unit (output controlling means)

BEST MODE(S) FOR CARRYING OUT THE INVENTION

Hereinafter, an embodiment of a vehicle driving force control device according to the present invention is described in detail with reference to the drawings. Meanwhile, the present invention is not limited by this embodiment.

Embodiment

Figure 2:
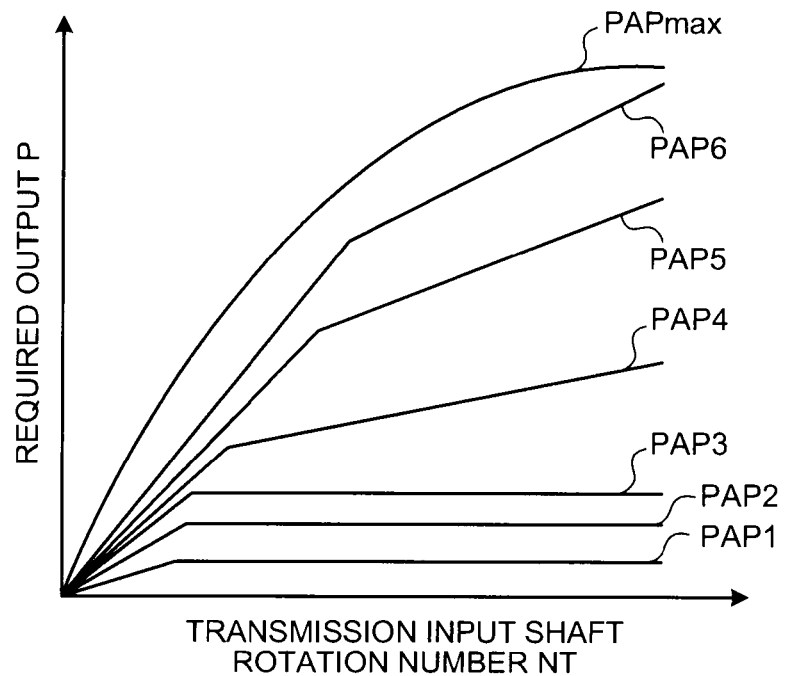
FIG. 2 is a graph of a required output with respect to a transmission input shaft rotation number set according to accelerator opening.
Figure 3:
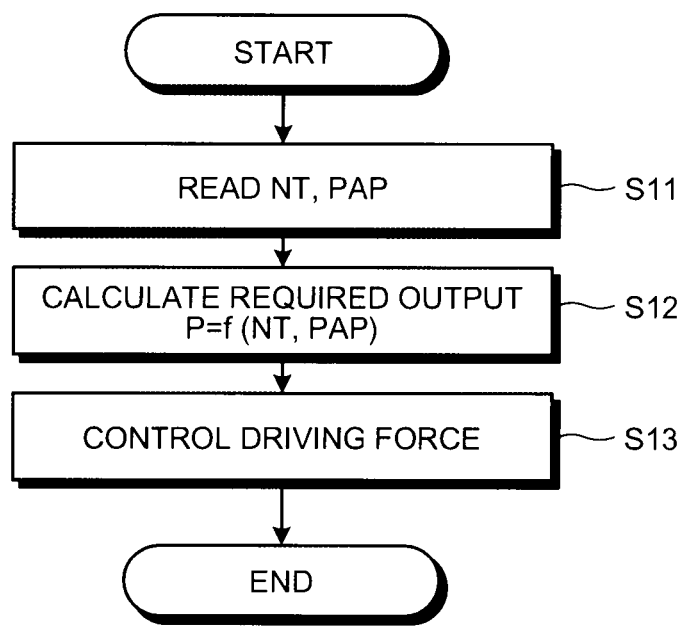
FIG. 3 is a flowchart of driving force control in the vehicle driving force control device of the embodiment.
Figure 4:
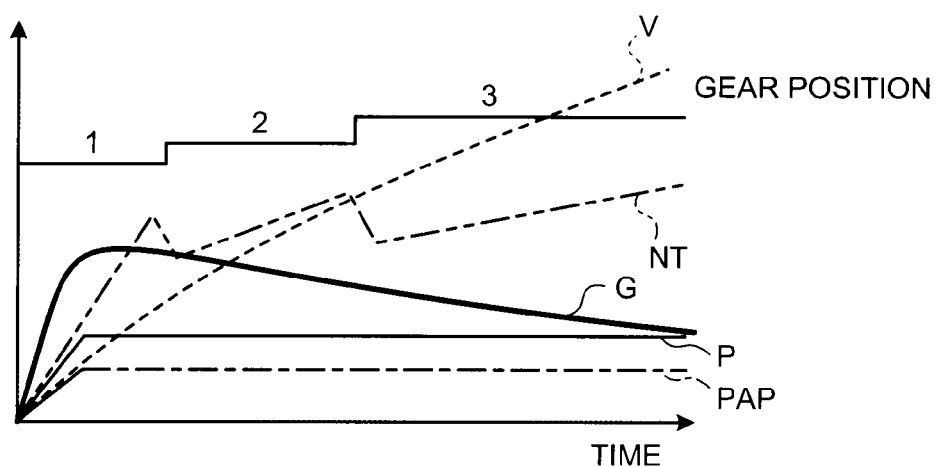
FIG. 4 is a graph of variation in vehicle driving force when the accelerator opening is not larger than a predetermined value.
Figure 5:
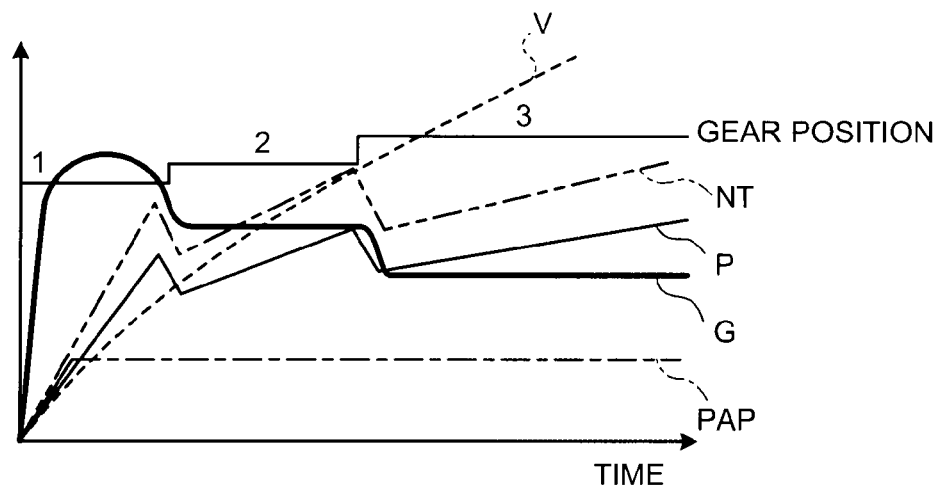
FIG. 5 is a graph of variation in vehicle driving force when the accelerator opening is larger than the predetermined value.

FIG. 1 is a schematic configuration diagram of a vehicle driving force control device according to one embodiment of the present invention, FIG. 2 is a graph of a required output with respect to a transmission input shaft rotation number set according to accelerator opening, FIG. 3 is a flowchart of driving force control in the vehicle driving force control device of this embodiment, FIG. 4 is a graph of variation in vehicle driving force when the accelerator opening is not larger than a predetermined value, and FIG. 5 is a graph of variation in vehicle driving force when the accelerator opening is larger than the predetermined value.

In the vehicle driving force control device according to the embodiment, as shown in FIG. 1, an engine 11 as an internal combustion engine is a water-cooling in-line four-cylinder engine in which a cylinder head is fastened onto a cylinder block and four cylinders 12 are arranged in series. Pistons not shown are joined to the four cylinders so as to be movable up and down, and a crankshaft is coupled to each piston through a connecting rod.

A combustion chamber 13 is divided by the cylinder block (cylinder 12), a cylinder head, and a piston. An intake port 14 and an exhaust port 15 are formed so as to be opposed to the combustion chamber 13 to communicate with each other, and the intake port 14 and the exhaust port 15 may be opened and closed by an intake valve and an exhaust valve not shown. Therefore, by moving up and down the intake valve and the exhaust valve at predetermined timing by an intake cum and an exhaust cum in synchronization with the engine, the intake port 14 and the exhaust port 15 are opened and closed, and the intake port 14 and the combustion chamber 13, and the combustion chamber 13 and the exhaust port 15 may communicate with each other, respectively.

A surge tank 17 is coupled to each intake port 14 through an intake manifold 16. On the other hand, an air cleaner 19 is attached to an air inlet of an intake tube 18, and an electronic throttle device 20 located on a downstream side of the air cleaner 19 and having a throttle valve is provided on the intake tube 18. A downstream end portion of the intake tube 18 is coupled to the surge tank 17.

An exhaust tube 22 is coupled to the exhaust port 15 through an exhaust manifold 21, and three-way catalysts 23 and 24 are mounted on the exhaust tube 22.

An injector 25 for injecting fuel to the intake port 14 or the combustion chamber 13 is mounted on the engine 11, and an ignition plug 26 for igniting air-fuel mixture is mounted on the combustion chamber 13.

The vehicle is equipped with an engine control unit (ECU) 27, and the ECU 27 may control fuel injection timing of the injector 25 and ignition timing of the ignition plug 26, and thus determines a fuel injection amount, the injection timing, and the ignition timing based on engine operating condition such as an intake air amount, throttle opening, and an engine rotation number, which are detected. An airflow sensor 28 is mounted on an upstream side of the intake tube 18 to output a measured intake air amount to the ECU 27. Also, a throttle position sensor 29 is provided on the electronic throttle device 20 to output current throttle opening to the ECU 27. Further, a crank angle sensor 30 is provided on a crank shaft to output a detected crank angle to the ECU 27, and the ECU 27 calculates the engine rotation number based on the crank angle. Also, a water temperature sensor 31 is provided on the cylinder block to output a detected engine cooling water temperature to the ECU 27.

A stepped automatic transmission 42 is coupled to the engine 11 thus configured through a torque converter 41. A propeller shaft 43 is coupled to the automatic transmission 42, right and left drive shafts 45 are coupled to the propeller shaft 43 through a differential gear 44, and right and left driving wheels 46 are coupled to the drive shafts 45.

Therefore, when the engine 11 drives, driving force thereof is output from the crank shaft to be input to an input shaft of the automatic transmission 42 through the torque converter 41, and is reduced herein to a predetermined gear ratio. Then, the reduced driving force is output from an output shaft of the automatic transmission 42 to the propeller shaft 43 and transmitted from the propeller shaft 43 to the right and left drive shafts 45 through the differential gear 44, and may rotate the right and left driving wheels 46.

The automatic transmission 42 is hydraulically controlled by a hydraulic control device 47. The vehicle is equipped with a transmission control unit (TCU) 48, and the TCU 48 may control gear shift timing or the like by hydraulically controlling the automatic transmission 42 by controlling the hydraulic control device 47. That is to say, an input shaft rotation number sensor (transmission input shaft rotation number detecting means) 49 for detecting an input shaft rotation number is provided on the automatic transmission 42 to output a detected input shaft rotation number to the TCU 48. Also, an accelerator opening sensor (accelerator opening detecting means) 50 for detecting accelerator opening according to a depression amount of an accelerator pedal is provided to output detected accelerator opening to the TCU 48. Further, a shift lever device 51 operated by a driver is connected to the TCU 48, and operation signals such as parking (P), reverse (R), neutral (N), and drive (D) are input.

Therefore, the ECU 27 and the TCU 48 together serve as a vehicle electronic control unit 52 to input and output information therebetween. Therefore, the vehicle driving force is controlled by controlling the engine 11 and the automatic transmission 42 according to the depression amount of the accelerator pedal by the driver.

The vehicle driving force control device according to this embodiment is provided with transmission required output calculating means for calculating a required output P of the automatic transmission 42 (vehicle) based on a transmission input shaft rotation number NT detected by the input shaft rotation number sensor 49 and accelerator opening PAP detected by the accelerator opening sensor 50, and output controlling means for controlling the engine 11 and the automatic transmission 42 based on the required output P calculated by the transmission required output calculating means. In this case, in this embodiment, the TCU 48 serves as the transmission required output calculating means, and the electronic control unit 52 (ECU 27, TCU 48) serves as the output controlling means.

The TCU (transmission required output calculating means) 48 sets the required output P to a constant value regardless of the transmission input shaft rotation number NT detected by the input shaft rotation number sensor 49 when the accelerator opening PAP detected by the accelerator opening sensor 50 is not larger than a predetermined value $PAP_S$ set in advance, and on the other hand, increases or decreases the required output P according to increase and decrease in the transmission input shaft rotation number NT detected by the input shaft rotation number sensor 49 when the accelerator opening PAP detected by the accelerator opening sensor 50 is larger than the predetermined value $PAP_S$.

Also, when controlling the vehicle driving force, shaft torque is mainly controlled. However, when the torque converter 41 is interposed between the engine 11 and the automatic transmission 42, the rotation number of the crank shaft of the engine 11 and the input shaft rotation number of the automatic transmission 42 are different from each other, so that the shaft torques of the two are different from each other and they are different from the shaft torque of the driving wheel 46. Therefore, in this embodiment, various calculations are performed by setting a physical parameter required for the depression amount of the accelerator pedal by the driver (accelerator opening PAP) to the required output P according to the transmission input shaft rotation number NT. In this case, it is represented as output=coefficient A×shaft torque×rotation number.

That is to say, when the depression amount of the accelerator pedal by the driver (accelerator opening) is small, it may be estimated that the driver wants to obtain smooth acceleration feel, and when the depression amount of the accelerator pedal by the driver (accelerator opening) is large, it may be estimated that the driver wants to obtain strong acceleration feel. Out of the acceleration feels felt by the driver, the smooth acceleration feel is intended to mean gradually decreasing acceleration, and the strong acceleration feel is intended to mean substantially constant or gradually increasing acceleration feel.

Then, in this embodiment, as shown in FIG. 2, a map for setting the required output P with respect to the transmission input shaft rotation number NT is created, and this is set for each acceleration opening. When the accelerator opening PAP is not larger than the predetermined value $PAP_S$, for example, in areas of PAP1 to PAP3, the required output P is set to the constant value regardless of the transmission input shaft rotation number NT. On the other hand, when the accelerator opening PAP is larger than the predetermined $PAP_S$, for example, in areas of PAP4 to PAPmax, the required output P is set so as to be increased or decreased according to increase and decrease in the transmission input shaft rotation number NT.

When the accelerator opening PAP is not larger than the predetermined value $PAP_S$ (in the areas of PAP1 to PAP3), when the transmission input shaft rotation number NT detected by the input shaft rotation number sensor 49 is in a predetermined low rotation area set in advance, the required output P is increased or decreased according to the increase and decrease in the transmission input shaft rotation number NT, and when the transmission input shaft rotation number NT is in a rotation area higher than the low rotation area, the required output P is set to the constant value regardless of the transmission input shaft rotation number NT.

Meanwhile, although six kinds of maps of the accelerator openings PAP1 to PAP6 are set in the areas not larger than the maximum accelerator opening PAPmax in the map for setting the required output P with respect to the transmission input shaft rotation number NT shown in FIG. 2, the number is not limited to six and may be larger or smaller than that, and between them may be obtained by interpolating. In addition, the required output P may be calculated by the accelerator opening PAP and the transmission input shaft rotation number NT by using a function formula without using such a three-dimensional map.

Therefore, in the driving force control in the vehicle driving force control device in this embodiment, as shown in the flowchart in FIG. 3, at a step S11, the TCU 48 reads the transmission input shaft rotation number NT detected by the input shaft rotation number sensor 49, and reads the accelerator opening PAP detected by the accelerator opening sensor

50. Subsequently, at a step S12, the TCU 48 calculates the required output P of the automatic transmission 42 (vehicle) based on the three-dimensional map in FIG. 2, based on the transmission input shaft rotation number NT, and the accelerator opening PAP.

Then, at a step S13, the electronic control unit 52 controls the driving force of the engine 11 and the automatic transmission 42 based on the required output P. That is to say, the ECU 27 determines the fuel injection amount, the injection timing, and the ignition timing based on the engine operating condition such as the intake air amount, the throttle opening, and the engine rotation number to control the injector 25 and the ignition plug 26, and the TCU 48 determines a gear position and the gear shift timing based on the engine operating condition to control the hydraulic control device 47.

At that time, when the accelerator opening PAP detected by the accelerator opening sensor 50 is not larger than the predetermined value $PAP_S$, the required output P is set to the constant value regardless of the transmission input shaft rotation number NT. Therefore, the acceleration of the vehicle gradually decreases and the smooth acceleration may be realized in which driving force difference is smaller before and after gear shift of the automatic transmission 42. On the other hand, when the accelerator opening PAP detected by the accelerator opening sensor 50 is larger than the predetermined value $PAP_S$, the required output P is set so as to be increased or decreased according to increase and decrease in the transmission input shaft rotation number NT. Therefore, the acceleration of the vehicle is substantially constant (or gradually increases) and the strong acceleration of which driving force is dropped only a little after the gear shift of the automatic transmission 42 may be realized.

Herein, variation in the vehicle driving force in a case in which the accelerator opening PAP detected by the accelerator opening sensor 50 is not larger than the predetermined value $PAP_S$ and in a case in which the accelerator opening PAP detected by the accelerator opening sensor 50 is larger than the predetermined value $PAP_S$ is described in detail.

As shown in FIG. 4, when the driver depresses the accelerator pedal and maintains the accelerator opening fixed at an amount not larger than the accelerator opening $PAP_S$, which is the predetermined value, the constant required output P is set based on the accelerator opening PAP and the transmission input shaft rotation number NT at that time. Then, in the automatic transmission 42, the gear is shifted from first to second and second to third according to the increase in the transmission input shaft rotation number NT, thereby a vehicle speed V increases, and on the other hand, acceleration G gradually decreases. Therefore, difference in the acceleration G before and after the gear shift by the automatic transmission 42 becomes 0 and the vehicle may realize the smooth acceleration of which driving force difference is small.

On the other hand, as shown in FIG. 5, when the driver depresses the accelerator pedal to maintain the fixed accelerator opening PAP larger than the accelerator opening $PAP_S$, which is the predetermined value, the required output P increasing or decreasing according to the increase and decrease in the transmission input shaft rotation number NT is set based on the accelerator opening PAP and the transmission input shaft rotation number NT at that time. Then, the gear is shifted from first to second and second to third according to increase in the transmission input shaft rotation number NT by the automatic transmission 42, so that when the vehicle speed V increases, the acceleration G is substantially constant with little dropping. Therefore, although the acceleration G changes before and after the gear shift by the automatic transmission 42, there is a characteristic feature in which the output increases at each gear position, so that the dropping of the acceleration G at the time of gear shift is small and the strong acceleration may be realized as a result.

In this manner, the vehicle driving force control device of this embodiment is provided with the input shaft rotation number sensor 49 for detecting the transmission input shaft rotation number to be input from the engine 11 to the automatic transmission 42, the accelerator opening sensor 50 for detecting the accelerator opening, the TCU 48 for calculating the required output of the automatic transmission 42 based on the transmission input shaft rotation number detected by the input shaft rotation number sensor 49 and the accelerator opening detected by the accelerator opening sensor 50, and the electronic control unit 52 for controlling the engine 11 and the automatic transmission 42 based on the required output, in which the TCU 48 sets the required output to the constant value regardless of the transmission input shaft rotation number when the accelerator opening is not larger than the predetermined value, and on the other hand, sets to increase or decrease the required output according to increase and decrease of the transmission input shaft rotation number when the accelerator opening is larger than the predetermined value.

Therefore, when the accelerator opening is not larger than the predetermined value, the smooth acceleration may be realized with small driving force difference before and after the gear shift in the automatic transmission 42 by setting the required output to the constant value, and when the accelerator opening is larger than the predetermined value, the strong acceleration may be realized with small dropping of the driving force after the gear shift in the automatic transmission 42 by increasing or decreasing the required output according to the increase and decrease in the transmission input shaft rotation number, thereby enabling to realize the acceleration feel required by the driver and to reduce a shift shock, as a result.

In addition, in the driving force control device according to this embodiment, when the accelerator opening is not larger than the predetermined value set in advance, the TCU 48 increases or decreases the required output according to the increase and decrease in the transmission input shaft rotation number when the transmission input shaft rotation number is in the predetermined low rotation area set in advance, and sets the required output to the constant value regardless of the transmission input shaft rotation number when the transmission input shaft rotation number is in the rotation area higher than the low rotation area. Therefore, the required output according to an acceleration depression degree by the driver may be set, and the smooth acceleration may be realized by reducing the difference in the driving force before and after the gear shift in the automatic transmission 42.

Also, in the driving force control device according to this embodiment, the torque converter 41 is arranged between the engine 11 and the automatic transmission 42 and the input shaft rotation number sensor 49 detects the transmission input shaft rotation number input from the engine 11 to the automatic transmission 42 through the torque converter 41, and the physical parameter required for the accelerator opening is set to the required output according to the transmission input shaft rotation number. Therefore, the required output is equivalent on the output side of the engine 11, the input side and output side of the automatic transmission 42, and the driving wheel 46 side, so that the process to calculate the variation in the shaft torque by the gear shift (torque converter 41) is not required and the control may be simplified.

INDUSTRIAL APPLICABILITY

As described above, the vehicle driving force control device according to the present invention is capable of realizing the acceleration feel required by the driver and of reducing the shift shock, and is useful when being applied to any vehicle.

The invention claimed is:

1. A vehicle driving force control device comprising:
an input shaft rotation number sensor that detects a transmission input shaft rotation number input from an internal combustion engine to a transmission;
an accelerator opening sensor that detects accelerator opening;
a transmission control unit that calculates a required output of the transmission based on the transmission input shaft rotation number detected by the input shaft rotation number sensor and the accelerator opening detected by the accelerator opening sensor; and
a control unit that controls the internal combustion engine and the transmission based on the required output calculated by the transmission control unit, wherein
the transmission control unit sets the required output to a constant value regardless of the transmission input shaft rotation number detected by the input shaft rotation number sensor when the accelerator opening detected by the accelerator opening sensor is not larger than a predetermined value set in advance, and increases or decreases the required output according to increase or decrease in the transmission input shaft rotation number detected by the input shaft rotation number sensor when the accelerator opening detected by the accelerator opening sensor is larger than the predetermined value.

2. The vehicle driving force control device according to claim 1, wherein when the accelerator opening detected by the accelerator opening sensor is not larger than the predetermined value set in advance, the transmission control unit increases or decreases the required output according to increase or decrease in the transmission input shaft rotation number when the transmission input shaft rotation number detected by the input shaft rotation number sensor is in a predetermined low rotation area set in advance, and sets the required output to the constant value regardless of the transmission input shaft rotation number when the transmission input shaft rotation number is in an area higher than the low rotation area.

3. The vehicle driving force control device according to claim 1, wherein a torque converter is arranged between the internal combustion engine and the transmission, and the input shaft rotation number sensor detects the transmission input shaft rotation number input from the internal combustion engine to the transmission through the torque converter.

* * * * *